United States Patent
Wu et al.

(10) Patent No.: US 10,773,899 B2
(45) Date of Patent: Sep. 15, 2020

(54) CONVEYING/LOADING APPARATUS AND LOADING METHOD THEREOF

(71) Applicant: ILLINOIS TOOL WORKS INC., Glenview, IL (US)

(72) Inventors: Xinhai Wu, Tianjin (CN); Lei Zhao, Tianjin (CN); Yujie Wang, Tianjin (CN); Fengchun Li, Tianjin (CN); Bei Li, Tianjin (CN); Zhen Liu, Tianjin (CN)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/169,346

(22) Filed: Oct. 24, 2018

(65) Prior Publication Data
US 2019/0127152 A1     May 2, 2019

(30) Foreign Application Priority Data

Oct. 26, 2017    (CN) .......................... 2017 1 1022262

(51) Int. Cl.
    *B65G 43/10*       (2006.01)
    *B65G 47/88*       (2006.01)
    (Continued)

(52) U.S. Cl.
    CPC ............ *B65G 43/10* (2013.01); *A47L 15/248* (2013.01); *B65G 15/44* (2013.01); *B65G 47/88* (2013.01);
    (Continued)

(58) Field of Classification Search
    CPC ...... A47L 15/24; A47L 15/241; A47L 15/245; A47L 15/246; B65G 43/10; B65G 47/88;
    (Continued)

(56) References Cited

U.S. PATENT DOCUMENTS 2,302,730 A  * 11/1942  Woolford ........... B21D 51/2692
                                                     134/72
2,611,381 A  *  9/1952  Davis .................... A47L 15/245
                                                     134/67

(Continued)

FOREIGN PATENT DOCUMENTS

DE        102010045290 B4 *  4/2016  ......... B65G 47/8815
WO       WO-2012173479 A1 * 12/2012  ............ A47L 15/241
WO       WO-2014193295 A1 * 12/2014  ............. B65G 47/88

*Primary Examiner* — Mark A Deuble
(74) *Attorney, Agent, or Firm* — Thompson Hine LLP

(57) ABSTRACT

A conveying/loading apparatus includes a first conveying apparatus having a first delivery part, with a blocking apparatus being disposed close to an output end of the first delivery part, and a second conveying apparatus having a second delivery part, with multiple supports being disposed at intervals on the second delivery part, and regions between the supports forming accommodating spaces for loading objects. An object is delivered to the output end of the first delivery part, and a first detection sensor detects a position of the object. A second detection sensor detects whether a support of the second delivery part has moved to a loading position, and whether the accommodating space between two adjacent supports is in an idle state. The first detection sensor causes the blocked object to pass, when the first detection sensor and the second detection sensor both have signals.

13 Claims, 4 Drawing Sheets

(51) Int. Cl.
    *A47L 15/24* (2006.01)
    *B65G 15/44* (2006.01)
    *B65G 47/29* (2006.01)

(52) U.S. Cl.
    CPC .......... *B65G 47/8807* (2013.01); *B65G 47/29* (2013.01)

(58) Field of Classification Search
    CPC ............ B65G 47/8807; B65G 47/8815; B65G 47/8823
    See application file for complete search history.

(56) References Cited

U.S. PATENT DOCUMENTS

| | | | |
|---|---|---|---|
| RE25,421 E | 7/1963 | Nolte | |
| 3,486,339 A | 12/1969 | Pinckard | |
| 3,584,752 A | 6/1971 | Ettlinger | |
| 3,738,465 A | 6/1973 | Ettlinger, Jr. | |
| 3,768,493 A * | 10/1973 | Kraeft | A47L 15/245 |
| | | | 134/46 |
| 4,281,675 A | 8/1981 | Pure | |
| 4,869,360 A * | 9/1989 | Brown | B27B 31/00 |
| | | | 198/460.1 |
| 6,026,831 A | 2/2000 | Jarvis | |
| 6,530,996 B2 | 3/2003 | Varpio | |
| 6,843,361 B2 * | 1/2005 | Maingonnat | B65G 47/82 |
| | | | 198/437 |
| 6,953,113 B2 * | 10/2005 | Iwasa | B65B 5/061 |
| | | | 198/419.1 |
| 7,104,027 B2 * | 9/2006 | Ford | B65B 5/106 |
| | | | 53/237 |
| 8,746,262 B2 | 6/2014 | Disch | |
| 9,085,421 B2 * | 7/2015 | Ford | B65G 47/8823 |
| 9,944,466 B2 | 4/2018 | Disch | |
| 9,962,061 B2 | 5/2018 | Firchau | |

\* cited by examiner

CONVEYING/LOADING APPARATUS AND LOADING METHOD THEREOF

TECHNICAL FIELD

The present invention relates to the technical field of automated conveying, in particular to a conveying/loading apparatus and a loading method thereof.

BACKGROUND

In the prior art, the degree of automation between a washing apparatus and a conveying apparatus is not high, hence there exists the problem that an object to be washed cannot be fed directly into the washing apparatus or delivered directly and accurately to a washing position; an operator is always needed to manually take off the object to be washed, which is delivered by the conveying apparatus, and place the object in a washing position of the washing apparatus; only then can a washing operation be performed. Not only does this increase the intensity of work for the operator and waste personnel, but the washing efficiency is low and the cost of work high.

The above information disclosed in the background section is merely intended to reinforce understanding of the background of the present invention, and may therefore contain information which has not formed prior art known to those skilled in the art.

SUMMARY

In view of the above, in the embodiments of the present invention it is hoped to provide a conveying/loading apparatus and a loading method thereof, to resolve or alleviate the technical problems existing in the prior art, and at least provide a beneficial alternative.

The technical solution of the embodiments of the present invention is realized as follows:

According to an embodiment of the present invention, a conveying/loading apparatus is provided, comprising:

a first conveying apparatus, having a first delivery part, with a blocking apparatus being disposed close to an output end of the first delivery part, the blocking apparatus being able to block or allow the passage of an object being delivered on the first delivery part;

a second conveying apparatus, having a second delivery part, with an input end of the second delivery part being fitted to the output end of the first delivery part; and multiple supports being disposed at intervals on the second delivery part, with regions between the supports forming accommodating spaces for loading the object;

a control system, electrically connected to the first delivery part, the second delivery part and the blocking apparatus.

In some embodiments, the blocking apparatus comprises a blocking piece and a first control apparatus; the blocking piece is movably disposed on the first conveying apparatus, and the first control apparatus is electrically connected to the blocking piece and the control system, and controls the manner of action of the blocking piece.

In some embodiments, the blocking piece is extendably/retractably disposed in the first delivery part of the first conveying apparatus.

In some embodiments, the blocking piece is rotatably disposed at a side of the first delivery part of the first conveying apparatus.

In some embodiments, the blocking piece uses an electromagnet, and the first control apparatus comprises a contactor and a time delay relay; the contactor controls an extension/retraction action of the electromagnet, and the time delay relay controls an extension/retraction time of the electromagnet.

In some embodiments, the blocking piece uses a blocking rod structure, and the first control apparatus controls a rotation angle of the blocking rod structure relative to the first delivery part.

In some embodiments, the supports extend outwards along a peripheral direction of the second delivery part, and a gap between the output end of the first delivery part and the input end of the second delivery part is greater than a length of outward extension of the supports.

In some embodiments, the supports use one of a shifting tooth structure, a plate structure or a mesh structure.

In some embodiments, the control system comprises a variable-frequency controller and at least one pair of detection sensors; the variable-frequency controller is electrically connected to the first conveying apparatus and the second conveying apparatus separately, and the two detection sensors are disposed at the output end of the first delivery part and the input end of the second delivery part respectively.

According to another embodiment of the present invention, a loading method of the conveying/loading apparatus is provided, comprising:

introducing the object from an input end of the first delivery part;

the control system driving the first delivery part and the second delivery part to operate;

a first of the detection sensors detecting a position of the object at the blocking apparatus and sending a signal, when the object is delivered to a position close to the output end of the first delivery part;

a second of the detection sensors detecting whether the support moving to the input end of the second delivery part has moved to a loading position, and whether the accommodating space between two adjacent said supports is in an idle state, and sending a signal when both (i) the support is in the loading position and (ii) the accommodating space is in the idle state;

the first of the detection sensors controlling the blocking apparatus to act, to allow the passage of the blocked object, when the first of the detection sensors and the second of the detection sensors both have signals;

the variable-frequency controller adjusting a relative speed of the first conveying apparatus and the second conveying apparatus, such that the object can be loaded into the idle accommodating space.

Due to the use of the above technical solution, the embodiments of the present invention have the following advantages:

The conveying/loading apparatus in the embodiments of the present invention can realize automated conveying and loading of objects, with no need for manual interference, and can therefore effectively increase working efficiency and save costs.

In the embodiments of the present invention, due to the provision of the variable-frequency controller for controlling the speeds of the first conveying apparatus and the second conveying apparatus, it is possible to adjust the operating frequency and speed according to operating demands.

In the embodiments of the present invention, due to the provision of the detection sensors, it is possible to detect the position of the object at the blocking apparatus, and the loading position of the supports, thereby enabling the precise loading of the object from the first conveying apparatus onto the second conveying apparatus.

The summary above is merely for illustrative purposes, and is not intended to impose limitations in any way. Besides the schematic aspects, embodiments and features described above, further aspects, embodiments and features of the present invention will be easily comprehensible by referring to the accompanying drawings and the following detailed description.

BRIEF DESCRIPTION OF THE DRAWINGS

In the accompanying drawings, unless specified otherwise, identical reference labels present in multiple drawings represent identical or similar components or elements. These drawings are not necessarily drawn to scale. It should be understood that these drawings merely depict some embodiments disclosed in accordance with the present invention, and should not be regarded as limiting the scope of the present invention.

DETAILED DESCRIPTION

Figure 1:
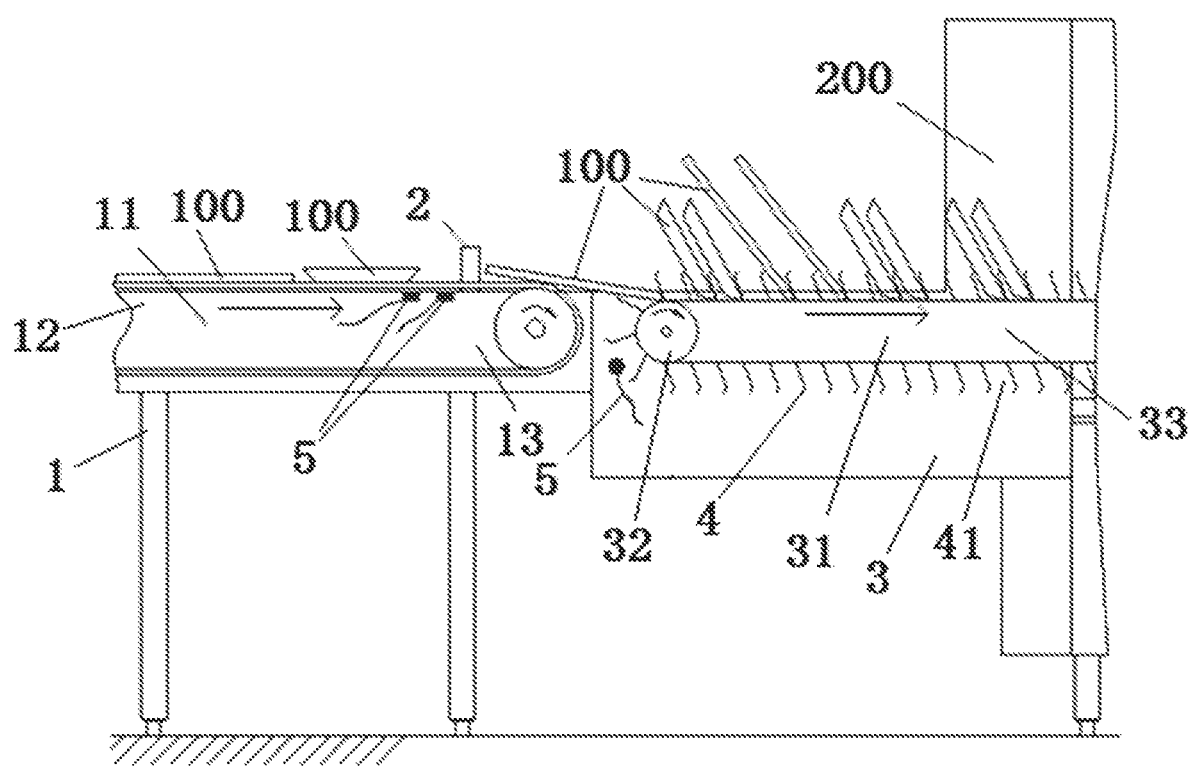
FIG. 1 is a structural schematic diagram of a conveying/loading apparatus in an embodiment of the present invention.

Some demonstrative embodiments are described merely in simple terms below. As those skilled in the art will recognize, the embodiments described could be amended in various ways without departing from the spirit or scope of the present invention. Thus, the drawings and descriptions are regarded as being substantially demonstrative, not restrictive.

In the description of the present invention, it must be understood that the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial" and "circumferential", etc. indicate directional or positional relationships which are based on the directional or positional relationships shown in the drawings, and are merely intended to facilitate the description of the present invention and simplify description, not to indicate or imply that the apparatus or element in question must have a specific direction, and be constructed and operated in a specific direction, and thus must not be interpreted as restricting the present invention.

In addition, the terms "first" and "second" are merely used for descriptive purposes, and must not be interpreted as indicating or implying relative importance or implicitly specifying the quantity of the technical features in question. Thus, a feature for which "first" and "second" are defined may expressly or implicitly comprise one or more of the feature. In the description of the present invention, the meaning of "multiple" is two or more, unless otherwise defined clearly and specifically.

In the present invention, unless otherwise clearly specified and defined, terms such as "mounted", "connected to each other", "connected" and "fixed" should be interpreted in a broad sense, e.g. may refer to a fixed connection, or a dismantlable connection, or the formation of a single body; may refer to a mechanical connection, or an electrical connection, or communication; may refer to a direct connection, or an indirect connection via an intermediate medium, and may refer to communication within two elements or an interactive relationship between two elements. Those skilled in the art may interpret the specific meaning of the abovementioned terms in the present invention according to the specific situation.

In the present invention, unless otherwise clearly specified and defined, the statement that a first feature is "above" or "below" a second feature may include the case where the first and second features are in direct contact, and may also include the case where the first and second features are not in direct contact but are in contact via another feature therebetween. Moreover, the statements that a first feature is "above", "over" and "on" a second feature include the cases where the first feature is directly above and diagonally above the second feature, or merely indicate that the horizontal height of the first feature is greater than that of the second feature. The statements that a first feature is "underneath", "below" and "beneath" a second feature include the cases where the first feature is directly above and diagonally above the second feature, or merely indicate that the horizontal height of the first feature is less than that of the second feature.

The disclosure below provides many different embodiments or examples, to be used for realizing different structures of the present invention. To simplify the disclosure of the present invention, components and settings in specific examples are described below. Of course, they are merely examples, and are not intended to restrict the present invention. In addition, the present invention may repeat reference digits and/or reference letters in different examples; such repetition is aimed at simplification and clarity, and does not in itself indicate a relationship between the various embodiments and/or settings being discussed. In addition, the present invention provides various specific examples of processes and materials, but those skilled in the art are capable of realizing the application of other processes and/or the use of other materials.

Embodiment 1

As shown in FIG. 1, this embodiment provides a conveying and loading apparatus, comprising:

a first conveying apparatus 1, having a first delivery part 11, the first delivery part 11 having an input end 12 and an output end 13, with a blocking apparatus being disposed in a position close to the output end 13 of the first delivery part 11, the blocking apparatus being able to block or allow the passage of an object 100 being delivered on the first delivery part 11;

a second conveying apparatus 3, having a second delivery part 31, the second delivery part 31 having an input end 32 and an output end 33, the input end 32 of the second delivery part 31 being fitted to the output end 13 of the first delivery part 11; and multiple supports 4 being disposed at intervals on the second delivery part 31, with regions between the supports 4 forming accommodating spaces 41 for loading the object;

a control system, electrically connected to the first delivery part 11, the second delivery part 31 and the blocking apparatus.

According to one embodiment, the first delivery part 11 and the second delivery part 31 are arranged on the same axis in a length direction, with the output end 13 of the first delivery part 11 and the input end of the second delivery part 31 being arranged so as to correspond to each other.

In this embodiment, the blocking apparatus comprises a blocking piece 2 and a first control apparatus (not shown in the figure); the blocking piece 2 is movably disposed on the first conveying apparatus 1, and the first control apparatus is electrically connected to the blocking piece 2 and the control system, and controls the manner of action of the blocking piece 2.

According to one embodiment, the blocking piece 2 is extendably/retractably disposed in the first delivery part 11 of the first conveying apparatus 1.

It must be explained that an extendable/retractable action of the blocking piece 2 may be realized using any manner of driving in the prior art, such as any driving mechanism capable of realizing linear extension/retraction movement, such as an electromagnet, a gas cylinder, a hydraulic cylinder or a linear motor, etc.

Figure 5:
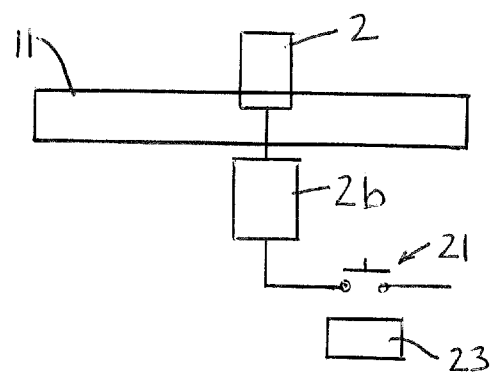
FIG. 5 shows an embodiment in which the blocking piece uses an electromagnet.

For example, when the blocking piece 2 uses an electromagnet 2b, per FIG. 5, the first control apparatus may use a contactor 21 to control the blocking piece 2; when the control system controls the contactor to perform a pull-closure action, the electromagnet 2b acts, the blocking piece 2 is drawn into the first delivery part 11, and the object 100 can pass from the position of the blocking apparatus and continue to be conveyed onward; when the control system controls the contactor 21 to perform a disconnection operation, the blocking piece 2 extends to the outside of the first delivery part 11 from within the first delivery part 11, thereby blocking the object 100 passing the position of the blocking apparatus.

When a gas cylinder, hydraulic cylinder or linear motor is used, the blocking piece 2 is connected to an extending/retracting end of the gas cylinder, hydraulic cylinder or linear motor, and the extending/retracting end drives the blocking piece 2 to extend or retract into the first delivery part 11.

To control an extension/retraction time of the blocking piece 2, the first control apparatus may also comprise a time delay relay 23 (FIG. 5) capable of controlling the extension/retraction time of the blocking piece 2 according to an instruction of the control system.

Figure 4:
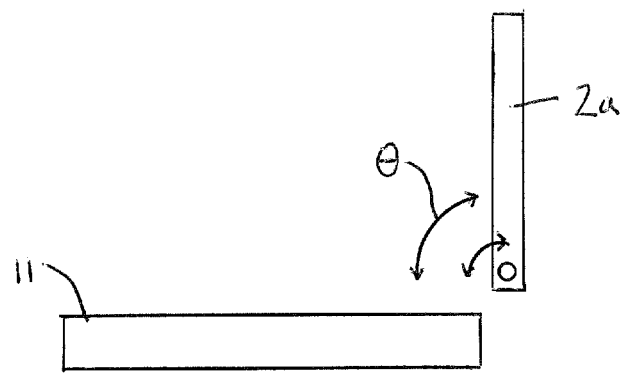
FIG. 4 shows an embodiment with a rotating blocking piece.

According to one embodiment, per FIG. 4, the blocking piece 2a is rotatably disposed at a side of the first delivery part 11 of the first conveying apparatus.

For example, the blocking piece 2a uses a blocking rod structure, rotatably disposed on a frame on one side or two sides of the first delivery part 11; the first control apparatus controls a rotation angle θ and a rotation direction of the blocking rod structure, and when the blocking rod rotates to one side of the first delivery part 11 so as to be level with the first delivery part 11, i.e. forms a structure similar to a gate, the object 100 reaching the position of the blocking rod structure can be blocked. Preferably, since objects 100 are of varying height, the height of the blocking rod structure can be adjusted relative to the first delivery part 11, or the rotation angle of the blocking rod structure is controlled; when the rotation angle of the blocking rod structure forms an acute angle with a surface of the first delivery part 11, the objective of blocking objects 100 of different heights can also be achieved.

To prevent loaded objects 100 from falling, the supports 4 are arranged so as to extend outwards along a peripheral direction of the second delivery part 31, and a gap between the output end 13 of the first delivery part 11 and the input end 32 of the second delivery part 31 is greater than a length of outward extension of the supports 4. The length of outward extension of the supports 4 need only be able to prevent supported objects 100 from falling or turning on their side.

According to one embodiment, the supports 4 may be disposed at equal intervals, disposed at unequal intervals, or disposed in such a way that the two arrangements are staggered. The supports 4 may be arranged perpendicular to an end face of the second delivery part 31, or arranged so as to form an angle of inclination relative to the end face of the second delivery part 31, to make it easier for objects 100 to be introduced.

In some embodiments, the supports 4 may use one of a shifting tooth structure, a plate structure or a mesh structure.

When a shifting tooth structure is used, for each support 4, multiple shifting tooth structures may be disposed at intervals in a width direction of the second delivery part 31.

When a plate structure is used, for each support 4, one plate structure may be disposed in the width direction of the second delivery part 31.

When a mesh structure is used, for each support 4, one entire mesh structure may be disposed in the width direction of the second delivery part 31; the mesh structure may be any mesh structure such as a grille or fence.

According to one embodiment, the control system comprises a variable-frequency controller and at least one pair of detection sensors 5; the variable-frequency controller is electrically connected to the first conveying apparatus 1 and the second conveying apparatus 3 separately, and the two detection sensors 5 are disposed at the output end 13 of the first delivery part 11 and the input end 32 of the second delivery part 31 respectively.

There are preferably two variable-frequency controllers, for controlling a rotation speed of the first delivery part 11 of the first conveying apparatus 1 and controlling a rotation speed of the second delivery part 31 of the second conveying apparatus 3 respectively, such that the rotation speeds of the first conveying apparatus 1 and the second conveying apparatus 3 can be matched to each other, to realize the transfer and loading of objects.

Preferably, multiple pairs of detection sensors 5 are used, so that the precision of detection can be improved. A first detection sensor 5 in each pair of detection sensors 5 is disposed at the output end 13 of the first delivery part 11, to facilitate the detection of the position of the object 100; when the blocking piece 2 is approached, the first detection sensor 5 can control the blocking apparatus, to realize an action of blocking the object 100 or an action of avoiding the object 100 by the blocking piece 2. A second detection sensor 5 in each pair of detection sensors 5 is disposed at an input end 32 of the second delivery part 31, for detecting whether a support 4 moving to the input end 32 of the second delivery part 31 has reached a loading position, and detecting whether an accommodating space adjacent to the support 4 is in an idle state. The pair of detection sensors 5 will transmit a signal and control the blocking piece 2 to act to allow the passage of the object 100 only when the object 100 has reached the position of the blocking piece 2 and at the same time the support 4 has reached the loading position and the accommodating space is idle.

In this embodiment, the detection sensor 5 may use a photoelectric sensor switch or an electromagnetic switch, etc.; the type of the detection sensor 5 is not limited to the abovementioned examples; any sensor is acceptable as long as it can realize a detection function.

In the embodiment above, the output end 33 of the second delivery part 31 of the second conveying apparatus 3 may be in communication with a washing apparatus 200, so as to realize the transportation, automated loading and cleaning of the object 100.

In the embodiment above, the output end 33 of the second delivery part 31 of the second conveying apparatus 3 may be in communication with a packaging apparatus, so as to realize the transportation, automated loading and packaging of the object 100.

Embodiment 2

Figure 2:
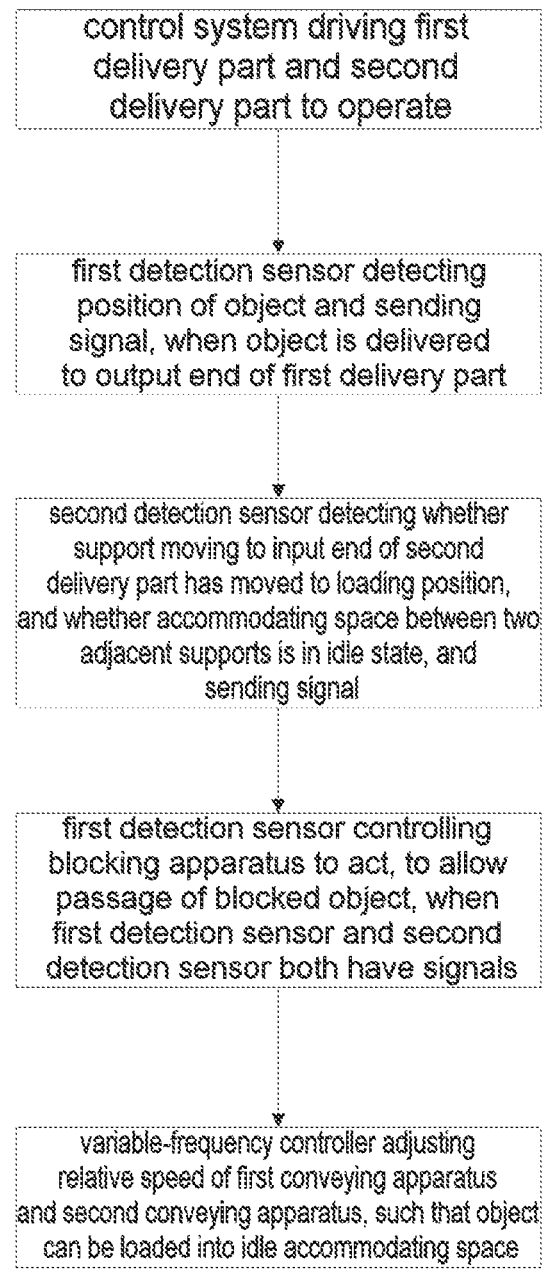
FIG. 2 is a flow chart of a loading method in an embodiment of the present invention.

According to another embodiment of the present invention, as shown in FIG. 2, a loading method of a conveying/loading apparatus is provided, comprising:

introducing the object 100 from the input end 12 of the first delivery part 11;

the control system driving the first delivery part 11 and the second delivery part 31 to operate;

the first detection sensor 5 detecting a position of the object 100 at the blocking apparatus and sending a signal, when the object 100 is delivered to the output end 13 of the first delivery part 11;

the second detection sensor 5 detecting whether the support 4 moving to the input end 32 of the second delivery part 31 has moved to a loading position, and whether the accommodating space 41 between two adjacent said supports 4 is in an idle state, and sending a signal when both (i) the support 4 is in the loading position and (ii) the accommodating space 41 is in an idle state;

the first detection sensor 5 controlling the blocking apparatus to act, to allow the passage of the blocked object 100, when the first detection sensor 5 and the second detection sensor 5 both have signals;

the variable-frequency controller adjusting a relative speed of the first conveying apparatus 1 and the second conveying apparatus 3, such that the object 100 can be loaded into the idle (e.g., unused or empty) accommodating space 41.

In this embodiment, before the conveying and loading of objects 100, operating frequencies of the first conveying apparatus 1 and the second conveying apparatus 3 can be adjusted according to the quantity of objects 100. When in a non-operative state, the blocking apparatus remains in a blocking state at all times. The blocking apparatus will act, to allow the passage of the object 100 and the precise loading of the object into the idle accommodating space 41, only when the first detection sensor 5 detects that the object 100 has reached the position of the blocking apparatus and sends a signal, and the second detection sensor 5 also detects that the support 4 has moved to the loading position and the accommodating space 41 is idle and sends a signal, i.e. only when the first detection sensor 5 and the second detection sensor 5 in the pair of detection sensors both send signals.

In this embodiment, once the object 100 has left the blocking apparatus, or the support 4 is not at the loading position or the accommodating space 41 is not in an idle state, the first detection sensor 5 controls the time delay relay to count time for t seconds, then the first detection sensor 5 controls the blocking apparatus to act, to change to the blocking state.

t seconds is a time which allows the passage of successive objects 100, i.e., the present apparatus can load objects 100 successively, and can also load one object 100 individually, to satisfy different operational demands.

Figure 3:
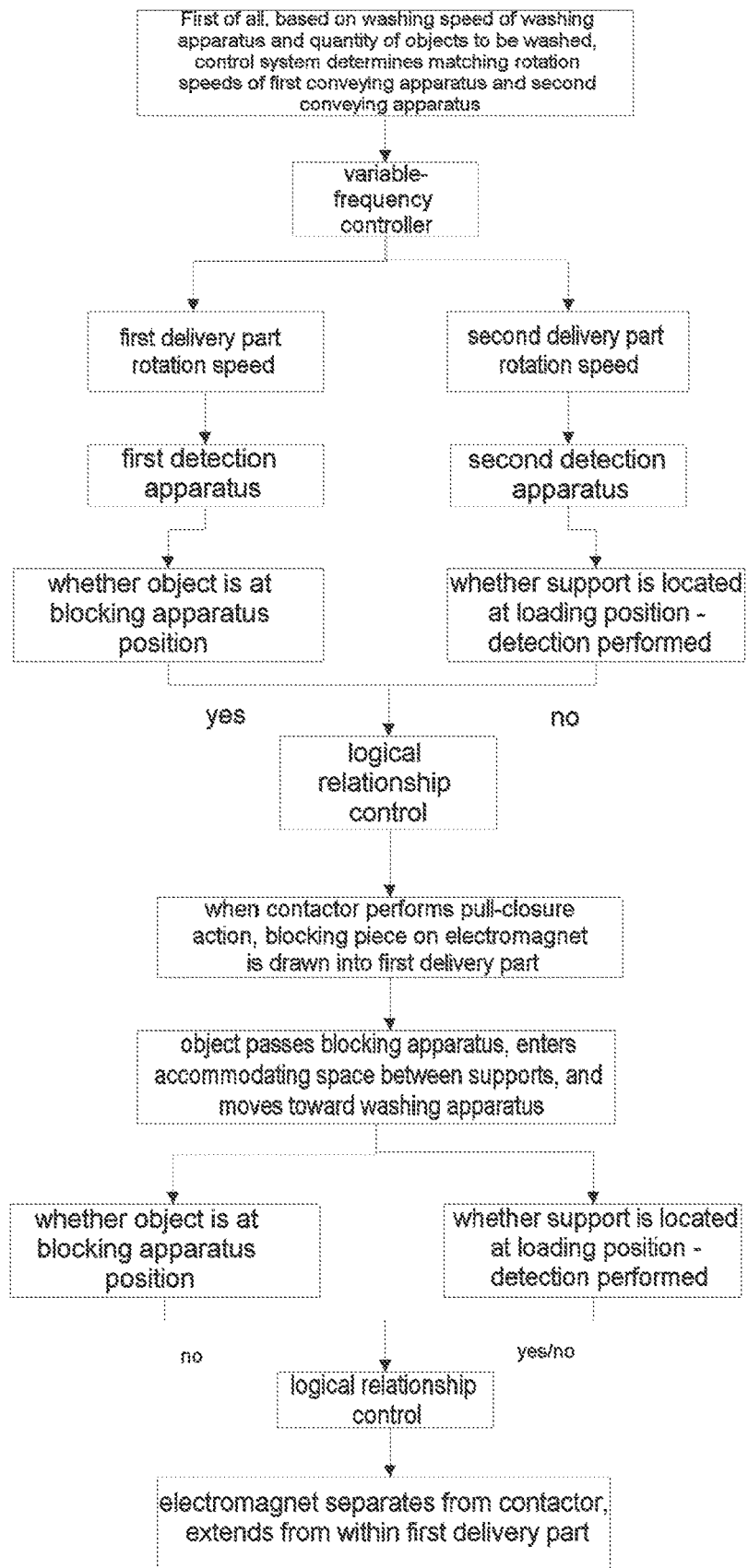
FIG. 3 is a flow chart of a loading method in another embodiment of the present invention.

According to one embodiment, as shown in FIG. 3, the washing apparatus 200 is connected to the output end 33 of the second delivery part 31 of the second conveying apparatus 3. First of all, based on a washing speed of the washing apparatus 200 and the quantity of the objects 100 to be washed, the control system determines matching rotation speeds of the first conveying apparatus 1 and the second conveying apparatus 2. At this time, the blocking apparatus is in the non-operative state (i.e. the blocking state), the control system controls the first conveying apparatus 1 and the second conveying apparatus 3 to start up, and the variable-frequency controller adjusts the rotation speeds of the first delivery part 11 and the second delivery part 31. A first detection apparatus 5 and a second detection apparatus 5 respectively detect whether the object 100 is at the position of the blocking apparatus and whether the support 4 is located at the loading position. Through logical relationship control, it is only when the first detection apparatus 5 and the second detection apparatus 5 both meet preset conditions that the signals of the first detection apparatus 5 and the second detection apparatus 5 are passed, controlling the contactor of the blocking apparatus to perform a pull-closure action, at which time the blocking piece 2 is drawn into the first delivery part 11, so that the blocked object 100 can continue to move onward from the position of the blocking apparatus, until it is accurately loaded into the accommodating space 41 between the supports 4 and moves into the washing apparatus 200 via the second delivery part 31. When the first detection apparatus 5 detects that there is no object 100 at the blocking apparatus or the second detection apparatus 5 detects that the support 4 is not located at the loading position, the signal of the first detection apparatus 5 or the second detection apparatus 5 is interrupted, the time delay relay in the first control apparatus is started up and counts time for t seconds, then the contactor disconnects, and the blocking piece 2 extends to the outside of the first delivery part 11 from within the first delivery part 11, thereby blocking the next object 100 passing the position of the blocking apparatus.

The embodiments above are merely particular embodiments of the present invention, but the scope of protection of the present invention is not limited thereto. Any person skilled in the art could easily think of various variations or substitutions thereof within the technical scope disclosed in the present invention, and these should all be included in the scope of protection thereof. Thus, the scope of protection of the present invention shall be the scope of protection of the claims.

What is claimed is:

1. A conveying/loading apparatus, comprising:
   a first conveying apparatus, having a first delivery part, with a blocking apparatus being disposed close to an output end of the first delivery part, the blocking apparatus being movable between a first position above the first delivery part to block the passage of an object being conveyed on the first delivery part and a second position to allow the passage of the object being conveyed on the first delivery part;
   a second conveying apparatus, having a second delivery part, with an input end of the second delivery part being fitted to the output end of the first delivery part, and multiple supports being disposed at intervals on the second delivery part, with regions between the supports forming multiple accommodating spaces; and
   wherein the first delivery part is axially aligned with the second delivery part to feed the object to the second delivery part so as to load the object into one of the accommodating spaces for conveyance within the one accommodating space along a top of the second delivery part;

wherein the supports extend outwards along a peripheral direction of the second delivery part, and an axial gap between the output end of the first delivery part and the input end of the second delivery part is greater than a length of outward extension of the supports;

a control system, electrically connected to the first delivery part, the second delivery part and the blocking apparatus;

wherein the control system is configured to effect movement of the blocking apparatus from the first position to the second position when both (i) the object is delivered to a position close to the output end of the first delivery part and (ii) one of the supports moving to the input end of the second delivery part has moved to a loading position to receive the object.

2. The conveying/loading apparatus as claimed in claim 1, wherein the blocking apparatus comprises a blocking piece and a first control apparatus; the blocking piece is movably disposed on the first conveying apparatus, and the first control apparatus is electrically connected to the blocking piece and the control system, and controls movement of the blocking piece.

3. The conveying/loading apparatus as claimed in claim 2, wherein the blocking piece is extendably/retractably disposed in the first delivery part of the first conveying apparatus.

4. The conveying/loading apparatus as claimed in claim 2, wherein the blocking piece is rotatably disposed at a side of the first delivery part of the first conveying apparatus.

5. The conveying/loading apparatus as claimed in claim 3, wherein the blocking piece uses an electromagnet, and the first control apparatus comprises a contactor and a time delay relay; the contactor controls an extension/retraction action of the electromagnet, and the time delay relay controls an extension/retraction time of the electromagnet.

6. The conveying/loading apparatus as claimed in claim 4, wherein the blocking piece uses a blocking rod structure, and the first control apparatus controls a rotation angle of the blocking rod structure relative to the first delivery part.

7. The conveying/loading apparatus as claimed in claim 1, wherein the supports use one of a shifting tooth structure, a plate structure or a mesh structure.

8. The conveying/loading apparatus as claimed in claim 1, wherein the control system comprises a variable-frequency controller and at least one pair of detection sensors; the variable-frequency controller is electrically connected to the first conveying apparatus and the second conveying apparatus separately, and the two detection sensors are disposed at the output end of the first delivery part and the input end of the second delivery part respectively.

9. A loading method of the conveying/loading apparatus as claimed in claim 8, comprising:
introducing the object from an input end of the first delivery part;
the control system driving the first delivery part and the second delivery part to operate;
a first of the detection sensors detecting a position of the object at the blocking apparatus and sending a signal, when the object is delivered to the position close to the output end of the first delivery part;
a second of the detection sensors detecting whether the support moving to the input end of the second delivery part has moved to the loading position, and whether the accommodating space between two adjacent said supports is in an idle state, and sending a signal when both (i) the support is in the loading position and (ii) the accommodating space is in the idle state;

the first of the detection sensors controlling the blocking apparatus to move to the second position, to allow the passage of the blocked object, when the first of the detection sensors and the second of the detection sensors both have signals;
the variable-frequency controller adjusting a relative speed of the first conveying apparatus and the second conveying apparatus, such that the object can be loaded into the idle accommodating space.

10. A conveying and loading apparatus, comprising:
a first conveying apparatus, having a first delivery part, with a blocking apparatus being disposed close to an output end of the first delivery part, the blocking apparatus being movable between a first position above the first delivery part in the path of an object being conveyed on the first delivery part so as to block the passage of the object and a second position to allow the passage of the object being conveyed on the first delivery part;
a second conveying apparatus, having a second delivery part, with an input end of the second delivery part being adjacent to the output end of the first delivery part, with an axial gap between the output end of the first delivery part and the input end of the second delivery part, wherein multiple supports are disposed at intervals on the second delivery part and regions between the supports form accommodating spaces for loading of the object from the first delivery part, wherein the supports pass through the axial gap; and
wherein the first delivery part is axially aligned with the second delivery part to feed the object to the second delivery part so as to load the object into one of the accommodating spaces for conveyance within the one accommodating space along a top of the second delivery part;
wherein the supports extend outwards along a peripheral direction of the second delivery part, and an axial gap between the output end of the first delivery part and the input end of the second delivery part is greater than a length of outward extension of the supports;
a control system, electrically connected to the first delivery part, the second delivery part and the blocking apparatus to selectively control loading of the object from the first delivery part into the one of the accommodating spaces of the second delivery part;
wherein the control system is configured to effect movement of the blocking apparatus from the first position to the second position when both (i) the object is delivered to a position close to the output end of the first delivery part and (ii) one of the supports moving to the input end of the second delivery part has moved to a loading position to receive the object.

11. The conveying and loading apparatus of claim 10, wherein the control system includes at least one first detection sensor disposed at the output end of the first delivery part and at least one second detection sensor disposed at the input end of the second delivery part;
wherein the at least one first detection sensor detects a position of the object at the blocking apparatus and sends a signal when the object is delivered to the position close to the output end of the first delivery part;
wherein the at least one second detection sensor detects whether two adjacent supports at the input end of the second delivery part are in a loading position and whether the accommodating space between the two adjacent said supports is empty, and sends a signal when both (i) the supports are in the loading position and (ii) the accommodating space is empty.

12. The conveying and loading apparatus of claim 11, wherein the control system is configured to control the blocking apparatus to act, to allow the passage of the blocked object, when the at least one first detection sensor and the at least one second detection sensor both have signals.

13. A conveying and loading apparatus, comprising:

a first conveying apparatus, having a first delivery part, with a blocking apparatus being disposed close to an output end of the first delivery part, the blocking apparatus being movable between a first position above the first delivery part in the path of an object being conveyed on the first delivery part so as to block the passage of the object and a second position to allow the passage of the object being conveyed on the first delivery part;

a second conveying apparatus, having a second delivery part, with an input end of the second delivery part being adjacent to the output end of the first delivery part, wherein multiple supports are disposed at intervals on the second delivery part and regions between the supports form accommodating spaces for loading of the object from the first delivery part; and wherein the first delivery part is axially aligned with the second delivery part to feed the object to the second delivery part so as to load the object into one of the accommodating spaces for conveyance within the one accommodating space along a top of the second delivery part;

a control system, electrically connected to the first delivery part, the second delivery part and the blocking apparatus to selectively control loading of the object from the first delivery part into the one of the accommodating spaces of the second delivery part;

wherein the control system is configured to effect movement of the blocking apparatus from the first position to the second position when both (i) the object is delivered to a position close to the output end of the first delivery part and (ii) one of the supports moving to the input end of the second delivery part has moved to a loading position to receive the object;

wherein the control system includes at least one first detection sensor disposed at the output end of the first delivery part and at least one second detection sensor disposed at the input end of the second delivery part;

wherein the at least one first detection sensor detects a position of the object at the blocking apparatus and sends a signal when the object is delivered to the position close to the output end of the first delivery part;

wherein the at least one second detection sensor detects whether two adjacent supports at the input end of the second delivery part are in a loading position and whether the accommodating space between the two adjacent said supports is empty, and sends a signal when both (i) the supports are in the loading position and (ii) the accommodating space is empty;

wherein the control system is configured to control the blocking apparatus to act, to allow the passage of the blocked object, when the at least one first detection sensor and the at least one second detection sensor both have signals;

wherein the control system includes a variable-frequency controller electrically connected to independently control the first conveying apparatus and the second conveying apparatus, and the control system is configured such that, when the at least one first detection sensor and the at least one second detection sensor both have signals, the variable frequency controller adjusts a relative speed between the first conveying apparatus and the second conveying apparatus such that the object is loaded into the empty accommodating space.

* * * * *